United States Patent

[11] 3,568,146

[72] Inventor August J. Knez
 12600 S. Roma Road, Palos Park, Ill. 60464
[21] Appl. No. 617,409
[22] Filed Feb. 20, 1967
[45] Patented Mar. 2, 1971
 Continuation-in-part of application Ser. No. 355,855, Mar. 30, 1964, Patent No. 3,305,829

[54] REAR-ALERTING SIGNAL FOR AUTOMOTIVE VEHICLES
 7 Claims, 4 Drawing Figs.
[52] U.S. Cl. ..................................................... 340/72, 340/83
[51] Int. Cl. ...................................................... B60q 1/46
[50] Field of Search ........................................... 340/69, 71, 72, 83, 262

[56] References Cited
UNITED STATES PATENTS
3,305,829  2/1967  Knez ........................... 340/72

Primary Examiner—Alvin H. Waring
Attorney—Burmeister & Kulie

ABSTRACT: A rear-alerting signal for an automotive vehicle is described in which actuation of a speed control such as the brake of the vehicle causes immediate flashing of two lamps at the rear of the vehicle. The two lamps are connected in separate electrical circuits with separate switches and a source of power, and both of the switches are controlled by a cam to alternately close the switches. The cam is driven by an electrical motor connected in a series circuit controlled by a switch mechanically coupled to the speed control of the vehicle, and this series circuit includes a normally closed delay switch for deactuating the cam after the lapse of a period of time. Actuation of the time delay switch causes continuous illumination of both lamps until the speed control is deactuated.

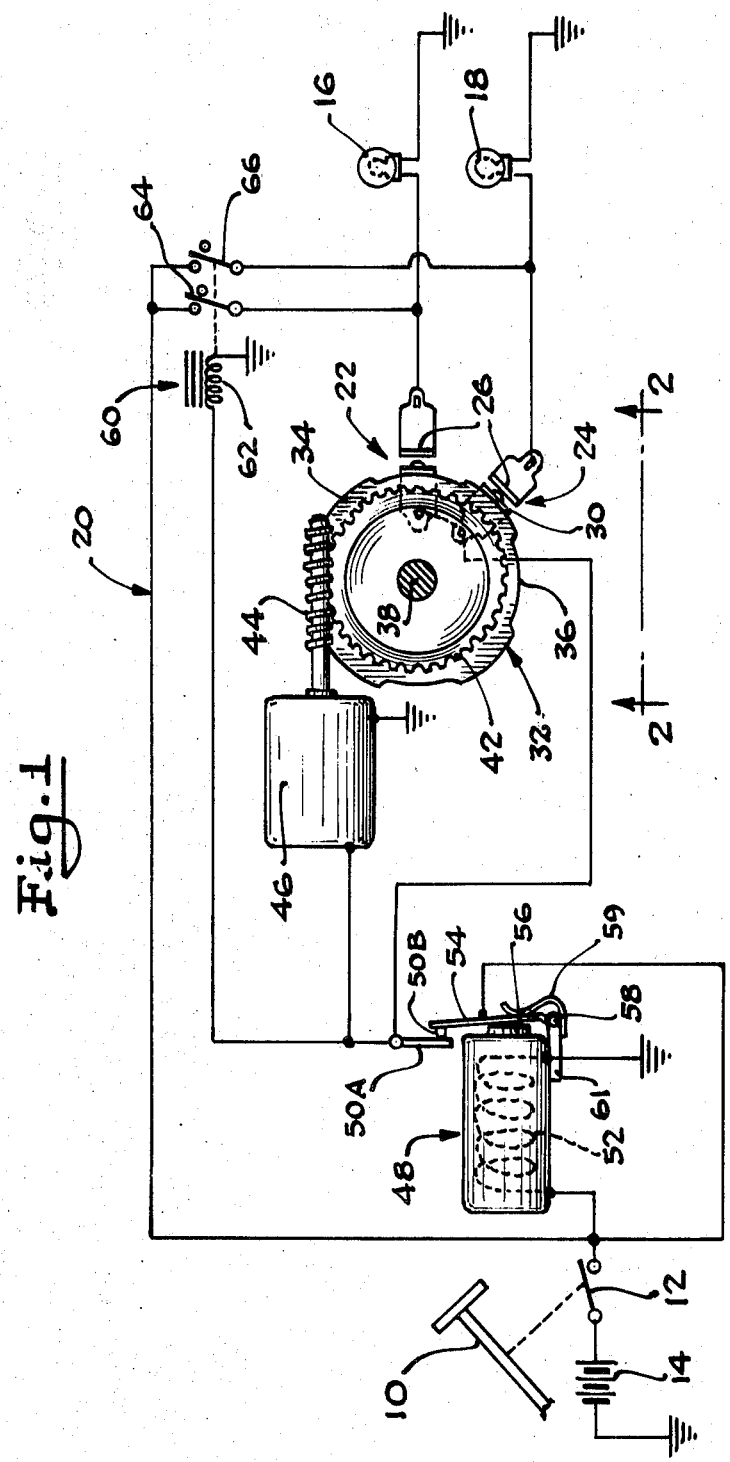
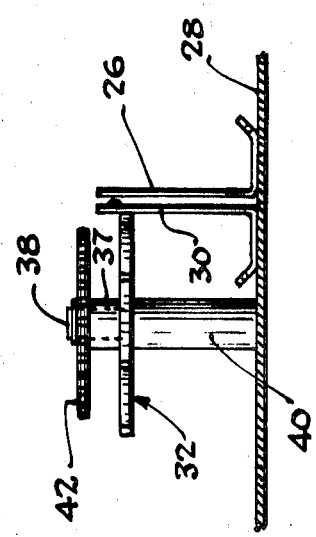
Fig. 1
Fig. 2
Inventor
August J. Knez
By Burmeister & Kulie
Attorneys

3,568,146

Inventor
August J. Knez
By Burmeister & Kulie
Attorneys

REAR-ALERTING SIGNAL FOR AUTOMOTIVE VEHICLES

This application is a continuation in part of U.S. application Ser. No. 355,855 entitled "Rear-alerting Signal for Automotive Vehicles," now U.S. Pat. No. 3,305,829 dated Feb. 21, 1967.

The present invention relates to signalling devices to indicate to a following driver the operative condition of a vehicle.

Rear-end collisions have long been a serious driving hazard. Such rear-end collisions are believed to occur as a result of the maintenance of too small an interval between vehicles for the speed of the vehicles, and driver error. Driver error may occur either from a hypnotic effect or confusion. A hypnotic effect results from constant speed driving in a relatively straight line, such as occurs on modern expressways and highways, and results in the inability of the driver to react rapidly to changes in traffic conditions. Driver confusion often results from distractions, particularly when at night a driver turns his eyes from the vehicle ahead of him during the period in which the driver of the vehicle ahead applies the brakes so that the change of illumination of the preceeding vehicle's brake lights from the ordinary tail light condition to the brake signal condition must be determined by a measurement of light magnitude alone.

It is an object of the present invention to provide a rear signal for an automotive vehicle which will provide a superior warning to changes in the operative condition of a vehicle to any following driver. Thus, it is an object of the present invention to provide a rear signalling device for an automotive vehicle which will reduce the frequency of rear-end collisions.

One of the most noticeably types of signals utilizing changes in light magnitude is the flashing light, however, too many flashing lights can become a distraction to the driver of a motor vehicle. At the present time, the brake lights of a vehicle are essentially three amplitude indicators, that is, an off indication, a tail light indication, and a brake light indication. If the brake light indication were simply replaced by a flashing lamp, the expressways and major highways would become a sea of flashing red lights. It is believed that this would add to the confusion present in drivers minds as to the operative condition of the cars preceding him down the thoroughfare.

It is thus an object of the present invention to provide a braking signal device for the rear of an automotive vehicle which provides a relatively short period of flashing light followed by a period of constant amplitude light signal.

It is also an object of the present invention to provide a flashing device for two or more tail lamps which maintains one of said lamps illuminated during operation, and further to provide a simple and inexpensive mechanism for achieving this operation.

These and further objects of the present invention will become more readily apparent upon a further consideration of this disclosure, particularly when viewed in the light of the drawings, in which:

FIG. 1 is a schematic diagram including the electrical circuit of a signalling device for an automotive vehicle according to the present invention;

FIG. 2 is a view taken along the line 2-2 of FIG. 3 illustrating in elevation a portion of the device illustrated in FIG. 1;

Figure 3:
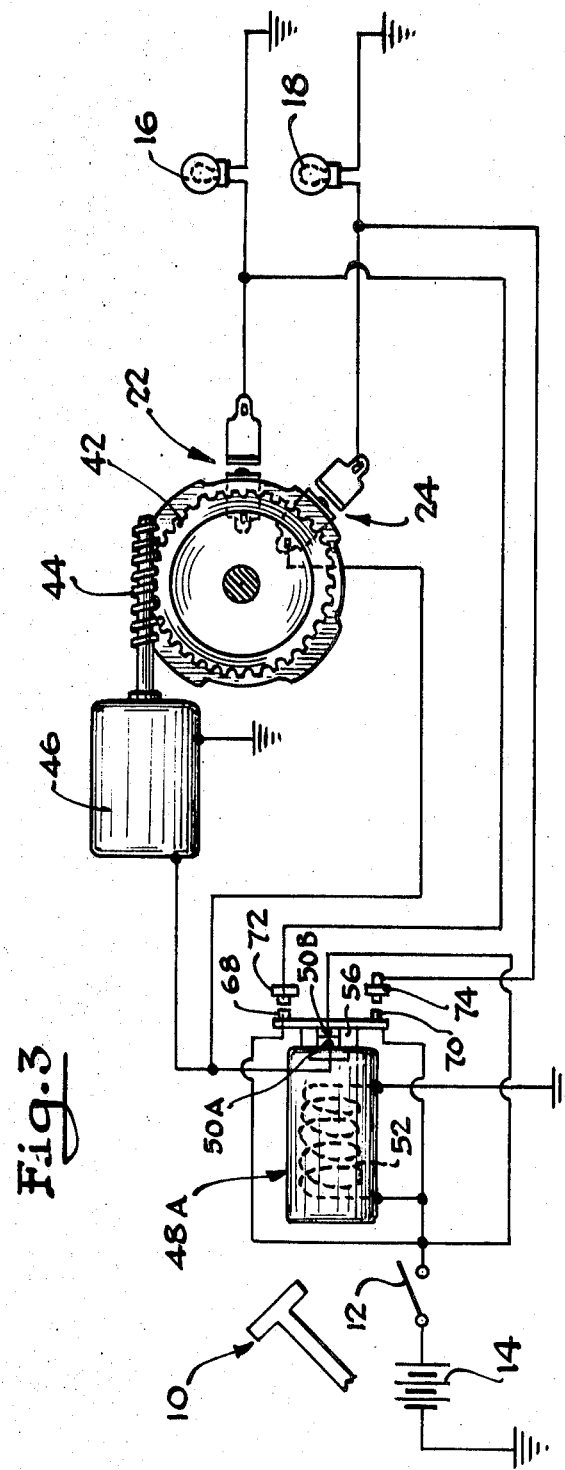
FIG. 3 is a schematic diagram including the electrical circuit of a signalling device for an automotive vehicle which constitutes another embodiment of the present invention.

As illustrated in FIGS. 1 and 2, the vehicle has a speed control in the form of a brake pedal 10, which upon depression actuates a brake mechanism to lower the speed of the vehicle in the conventional manner. The brake pedal 10 also actuates a switch 12 which is utilized to close an electrical circuit having a battery 14 and two tail lamps 16 and 18 located at the rear of the vehicle for the purpose of warning following motorists that the speed of the vehicle is being reduced and to prepare to stop.

In accordance with the present invention, a novel flasher mechanism 20 is electrically connected between the tail lamps 16 and 18 and the electrical switch 12. The flasher mechanism 20 includes a pair of normally open electrical switches 22 and 24 which are electrically connected between the lamps 16 and 18, respectively, and the electrical switch 12. Each of the switches 22 and 24 contain a relatively stationary leaf contact 26 which is mounted on a supporting base or frame 28, and a second relatively movable leaf contact 30 mounted on the frame 28. The movable contacts 30 of the switches 22 and 24 confront and ride on a rotatable cam 32 which has high sectors 34 separated by low sectors 36. The leaf contacts 26 and 30 of each switch 22 and 24 are electrically insulated from each other, and mechanically spring biased away from each other, so that the contacts 26 and 30 are spaced and insulated from each other when the leaf contact 30 abuts a low sector 36 of the cam 32. The leaf contacts 26 and 30 of the switches 22 and 24 are in abutment forming a closed switch when the movable contact 30 is in abutment with a high sector 34 of the cam 32.

The cam 32 has an opening at its center and is secured at its center on a hollow sleeve 37. The sleeve 37 and cam 32 are rotatably mounted on a shaft 38, and the shaft 38 is mounted normally on the frame 28. The surface of the cam 32 which confronts the frame 28 rotatably abuts one end of a second sleeve 40 which is disposed about the shaft 38 between the frame 28 and the cam 32. A spur gear 42 is also journaled at its center about the shaft 38, and the spur gear is mounted on the end of the sleeve 37 opposite the cam 32 to form an integral unit consisting of the spur gear 42, sleeve 37 and cam 32.

The spur gear 42 engages a worm gear 44, and the worm gear 44 is driven by an electric motor 46. The electric motor 46 is electrically connected in a closed series circuit with a time delay relay 48, the electrical switch 12, and the battery 14. The time delay relay 48 has a pair of switch contacts 50A and 50B which are normally closed, and these contacts open following a period of actuation of a coil 52 of the time delay relay. One of the contacts 50A is mounted in a stationary position, and the other contact 50B is mounted on a lever arm or clapper 54 which abuts a core 56 and is pivoted at the end of the clapper opposite the contact 50B on a pin 58 mounted on the time delay relay 48. A leaf spring 59 mechanically urges the clapper 54 into contact with one end of the core 56, the other end of the core 56 being anchored within the time delay relay 48.

When the pedal 10 is depressed, thus closing the switch 12, the motor 46 is energized. Energizing the motor 46 rotates the cam 32, thus periodically opening and closing the switches 22 and 24. The cam 32 has equal length high sectors 34 and low sectors 36, and in the preferred construction, the high sectors 34 and low sectors 36 are of equal length. Hence, when one of the switches 22 or 24 is closed, the other is open, and the lamps 16 and 18 are periodically energized in out of phase relation and for equal time periods. If the high sectors 34 and low sectors 36 are not of equal length, then there will be periods in which both lamps 16 and 18 are either illuminated or dark.

The time delay relay 48 has a period of from 2 to 5 seconds following closing of the switch 12 before the core 59 becomes sufficiently elongated to open the switch contacts 50A and 50B. In a preferred construction, the core 56 is constructed of a material having a high thermal coefficient of expansion, such as brass or aluminum, and the coil 52 is resistive heater connected in a closed series circuit with the switch 12 and battery 14. Other types of time delay relays may also be employed, such as bimetallic devices, or dashpot time delay electromagnetic relays, such as manufactured by Magnecraft Electric Company of Chicago, Illinois.

Opening of the time delay relay contacts 50A and 50B deenergizes the motor 46, and since actuation of the relay 48 does not open the circuit to the heater coil 52, the contacts 50A and 50B will remain open as long as the switch 12 remains closed. In the particular construction set forth, the moveable leaf contacts 30 of the switches 22 and 24 are electrically connected to the contact 50A, and therefore the circuits for the lamps 16 and 18 through the switch 12 and battery 14 are also opened when the time delay relay 48 is actuated and the contacts 50A and 50B are opened, thus deenergizing the lamps 16 and 18.

In order to prevent deenergization of the lamps 16 and 18 on actuation of the time delay relay 48, a normally closed double pole single throw relay 60 is utilized to electrically connect the lamps 16 and 18 to the terminal of the switch 12 opposite the battery 14. The relay has a coil 62 electrically connected in a closed circuit with the time delay relay contacts 50A and 50B, the switch 12, and the battery 14. The relay 60 has two switches 64 and 66 with one terminal of each switch electrically connected to the leaf contact 26 of one of the switches 22 and 24, respectively, and a second terminal electrically connected to the terminal of switch 12 opposite the battery 14. Since actuation of the relay 60 opens the switches 64 and 66, the lamps 16 and 18 are only energized through the relay 60 during periods when contacts 50A and 50B of the time delay relay are open, the switch 12 being closed. Hence, actuation of the brake pedal 10 results in periodic flashing of the lamps 16 and 18 for a period of from 2 to 5 seconds, and thereafter constant illumination of the lamps 16 and 18, unless the pedal 10 and the switch 12 is deactuated before that time. Whenever the switch 12 is opened the lamps become deenergized, and the motor 46 also will be deenergized if the switch 12 is opened before the period for actuation of the time delay relay 48 expires.

Figure 4:
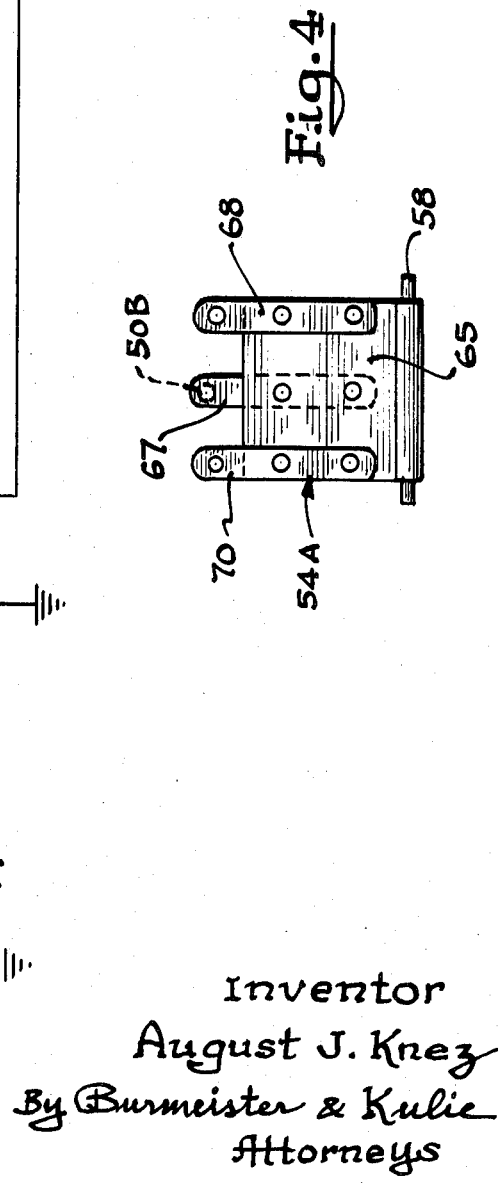
FIG. 4 is a side elevational view of the clapper of FIG. 3.

FIGS. 3 and 4 illustrate an embodiment of the invention in which the relay 60 is omitted and a modified time delay relay 48A is utilized to provide constant illumination of the lamps 16 and 18 following the period of the time delay relay 48A. Hence, identical circuit elements in FIGS. 3 and 4 with those of FIGS. 1 and 2 bear identical reference numerals.

The time delay relay 48A also has a coil 52 and a core 56 which expands upon heating and is anchored at one end within the relay 48A and abuts a clapper at the other end. The clapper, however is of a different construction than the clapper 54 of FIGS. 1 and 2 and has been designated 54A. As best illustrated in FIG. 4, the clapper has a pin 58 at one end which is pivotally mounted on a support 61 mounted on the relay 48A. A leaf spring 59 extends from the support 61 to abut the clapper 54A and urge the clapper into abutment with the core 56. The same construction has been shown in FIG. 1 for this purpose with regard to clapper 54. The clapper 54A, however, is constructed with a plate 65 of electrically insulating material, such as fiberboard, which carries the pin 58 at one end. Centrally of the board 65 is a strip 67 of electrically conducting material, preferably of high resilience, such as spring bronz utilized for relay contacts, and the strip 67 extends beyond the edge of the plate 65 remote from the pin 58 to carry one of the two contacts 50B. In this respect, the clapper 54A functions the same as the clapper 54. However, the clapper also has two strips 68 and 70 mounted on the opposite side of the plate 65 and on opposite sides of the strip 67. The strips 68 and 70 are identical to the strip 67, except the contacts of the strips 68 and 70 protrude from the opposite sides thereof.

Both of the strips 68 and 70 are electrically connected to terminal of the switch 12 remote from the battery 14. The strip 68 confronts a stationary contact 72 which is electrically connected between the junction between the switch 22 and the lamp 16. In like manner, the strip 70 confronts a stationary contact 74 which is electrically connected to the junction between the lamp 18 and the switch 24.

In operation, actuation of the foot pedal 10 closes the switch 12 in the alarm system of FIGS. 3 and 4. Closing of the switch permits electrical current to flow through the contacts 50A and 50B to energize the motor 46 and also to provide power through the switches 22 and 24 for the lamps 16 and 18. Hence, during the period of time in which the time delay relay remains closed, the lamps 16 and 18 will be alternately illuminated. After the lapse of 2 to 5 seconds, the clapper 54A of the time delay relay will be pivoted to open the switch contacts 50A and 50B, thereby deenergizing the motor 46 and removing power from the moveable contacts 30 of the switches 22 and 24. However, movement of the clapper 54A is effective to close the switch contacts between the strips 68 and 70 and the contacts 72 and 74, respectively, thus electrically connecting the lamps 16 and 18 in a closed series circuit through the switch 12 and the battery 14. The lamps 16 and 18 will thus remain illuminated as long as the time delay 48A remains in its actuated condition, and this period is controlled by the switch 12, since it controls the current through the heating coil 52.

From the foregoing disclosure, those skilled in the art will readily devise many modifications of the present structure within the intended scope of the present invention. Further, many applications for the present invention beyond that of signalling for automotive vehicles will be apparent from this disclosure to those skilled in the art. It is therefore intended that the scope of the present invention be not limited by the foregoing disclosure, but rather only by the appended claims.

I claim:

1. A signaling system responsive to actuation of a motor vehicle speed control comprising, in combination: a pair of lamps mounted on the vehicle in spaced relation and visible from the rear of the vehicle; a first series electrical circuit including a source of electromotive force, a switch having an actuation member mechanically coupled to the speed control of the motor vehicle, a second electrical switch having an actuation member, the second electrical switch being electrically connected in a second series electrical circuit with the source of electromotive force and the first of the lamps of said pair, a third electrical switch having an actuation member, the third electrical switch being electrically connected in a third series electrical circuit with the source of electromotive force and the second of the lamps of said pair; means for driving the actuation members of the second and third switches comprising a cam having a plurality of high sectors separated by low sectors, the actuation members of the second and third switches riding on the cam and closing the switches when disposed on a high sector and opening the switches when disposed on a low sector, and an electrical motor mechanically coupled to the cam and electrically connected in a fourth series circuit with the source of electromotive force and the first switch for rotating the cam responsive to closing of the first switch, said fourth series circuit including a normally closed time delay switch for deactuating the motor.

2. A signaling system responsive to actuation of a motor vehicle speed control comprising the combination of claim 1 wherein the cam has high and low sections of approximately equal arc lengths and the actuation members of the first and second electrical switches ride on the cam at points disposed on radii displaced by the angle enscribed by said arc length or a multiple thereof.

3. A signaling system responsive to actuation of a motor vehicle speed control comprising the combination of claim 1 in combination with a time delay relay having a pair of relay contacts electrically connected between the source of electromotive force and the electric motor, said time delay relay having a pair of control terminals electrically connected in a closed series circuit with the first electrical switch and the source of electromotive force, said relay contacts being normally closed and opening after power is applied to the control terminals for a period of time of from 2 to 5 seconds.

4. A signaling system responsive to actuation of a motor vehicle speed control comprising the combination of claim 3 in combination with a relay having a control coil electrically connected in parallel with the electric motor and two pair of normally closed switch contacts; said switch contacts opening on energizing of the control coil, the first pair of switch contacts being electrically connected in a closed series circuit with the first lamp, the first electrical switch and the source of electromotive force, and the second pair of switch contacts being electrically connected in a closed series circuit with the second lamp, the first electrical switch and the source of electromotive force.

5. A signaling system responsive to actuation of a motor vehicle speed control comprising the combination of claim 3 wherein the time delay relay has a heater mounted adjacent to a thermally expandable core, said core being mounted against translation at one end, a clapper abutting the other end of said core and being mounted for pivotal movement about an axis approximately normal to the expansion axis of the core and displaced therefrom, one of the relay contacts of the time delay relay being mounted on the clapper and the other relay contact being in a fixed position relative to said time delay relay.

6. A signaling system responsive to actuation of a motor vehicle speed control comprising the combination of claim 5 wherein the clapper carries two additional electrical contacts electrically interconnected with the first contact thereof, each of the additional electrical contacts confronting a stationary electrical contact and being normally spaced therefrom, one of said stationary contacts being electrically connected to the first lamp and the other stationary contact being electrically connected to the second lamp, movement of the clapper achieving contact between the additional contacts and the stationary contacts.

7. A signaling system responsive to actuation of a motor vehicle speed control comprising the combination of claim 1 wherein the second and third series electrical circuits include the first switch.